US012647287B2

(12) United States Patent
Antonio et al.

(10) Patent No.: US 12,647,287 B2
(45) Date of Patent: Jun. 2, 2026

(54) USING NON-FUNGIBLE TOKENS STORED ON A DIGITAL LEDGER FOR CONTROLLING OWNERSHIP OF WELL LOG DATA

(71) Applicant: Halliburton Energy Services, Inc., Houston, TX (US)

(72) Inventors: Daniel Antonio, Kingwood, TX (US); Andreas Gerhard Sadlier, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 615 days.

(21) Appl. No.: 17/505,022

(22) Filed: Oct. 19, 2021

(65) Prior Publication Data

US 2023/0118406 A1     Apr. 20, 2023

(51) Int. Cl.
| | |
|---|---|
| *H04L 9/00* | (2022.01) |
| *E21B 47/12* | (2012.01) |
| *G06F 21/10* | (2013.01) |
| *G06F 21/60* | (2013.01) |
| *G06F 21/62* | (2013.01) |
| *G06F 21/64* | (2013.01) |
| *G06Q 50/02* | (2024.01) |
| *G06Q 30/0601* | (2023.01) |

(52) U.S. Cl.
CPC ............... *H04L 9/50* (2022.05); *E21B 47/12* (2013.01); *G06F 21/10* (2013.01); *G06F 21/602* (2013.01); *G06F 21/6218* (2013.01); *G06Q 50/02* (2013.01); *G06F 21/64* (2013.01); *G06Q 30/0641* (2013.01); *G06Q 2220/00* (2013.01)

(58) Field of Classification Search
CPC ............... G06Q 30/0641; G06Q 50/02; G06Q 2220/00; G06F 21/10; G06F 21/602
USPC ........................................................ 705/51
See application file for complete search history.

(56) References Cited

U.S. PATENT DOCUMENTS

| | | | |
|---|---|---|---|
| 8,250,378 B1 * | 8/2012 | Sims ................... | H04L 63/0428 713/193 |
| 10,832,522 B2 | 11/2020 | Simons | |
| 11,075,891 B1 * | 7/2021 | Long ..................... | H04L 9/3213 |

(Continued)

OTHER PUBLICATIONS

International Application, International Search Report and Written Opinion, PCT/US2021/055576, Jul. 7, 2022, 9 pages.

(Continued)

*Primary Examiner* — Wodajo Getachew
(74) *Attorney, Agent, or Firm* — Kilpatrick Townsend & Stockton LLP

(57) ABSTRACT

Non-fungible tokens (NFTs) can be generated and stored on a digital ledger for use in controlling ownership of well log data in some examples described herein. In one such example, a system can encrypt well log data to generate encrypted well-log data. The system can then generate a new record that associates a non-fungible token with the encrypted well-log data, where the non-fungible token is usable to track ownership of the well log data. The system can then publish the new record to a digital ledger that is distributed among a plurality of computer nodes of a ledger network. The new record can be published to the digital ledger in response to at least a subset of the computer nodes reaching a consensus decision to add the new record to the digital ledger.

20 Claims, 5 Drawing Sheets

(56) References Cited

U.S. PATENT DOCUMENTS

| | | | |
|---|---|---|---|
| 2013/0346754 A1* | 12/2013 | Selman | H04L 69/18 |
| | | | 713/175 |
| 2016/0034818 A1 | 2/2016 | Knecht et al. | |
| 2020/0005284 A1* | 1/2020 | Vijayan | G06Q 20/065 |
| 2020/0074461 A1* | 3/2020 | DeRosa-Grund | |
| | | | H04N 21/2543 |
| 2020/0127834 A1* | 4/2020 | Westland | H04L 9/3221 |
| 2020/0157887 A1* | 5/2020 | Alonso | E21B 7/04 |
| 2020/0242105 A1* | 7/2020 | Rich | H04L 67/02 |
| 2021/0035246 A1* | 2/2021 | Schouppe | H04L 9/50 |
| 2021/0097508 A1 | 4/2021 | Papanikolas | |
| 2021/0266169 A1* | 8/2021 | Gupta | H04L 63/18 |
| 2021/0319431 A1* | 10/2021 | Yantis | G06Q 20/123 |
| 2021/0332696 A1* | 10/2021 | Wise | H04L 12/40 |
| 2022/0042410 A1* | 2/2022 | Doughty | E21B 43/26 |

OTHER PUBLICATIONS

ETHEREUM.com, "Mintbase—Virtual Economy Starter Pack/ NFT Factory", available on the internet at https://eth.mintbase.io at least as early as Aug. 17, 2021, 4 pages.

ETHEREUM.com, "Non-fungible tokens (NFT)", available on the internet at https://ethereum.org/en/nft at least as early as Aug. 17, 2021, 9 pages.

GITHUB.com, "OpenZeppelin Contracts", available on the internet at https://github.com/OpenZeppelin/openzeppelin-contracts at least as early as Aug. 17, 2021, 4 pages.

OPENSEA.com, available on the internet at https://opensea.io at least as early as Aug. 17, 2021, 3 pages.

RARIBLE.com, available on the internet at https://rarible.com at least as early as Aug. 17, 2021, 3 pages.

* cited by examiner

USING NON-FUNGIBLE TOKENS STORED ON A DIGITAL LEDGER FOR CONTROLLING OWNERSHIP OF WELL LOG DATA

TECHNICAL FIELD

The present disclosure relates generally to well log data used in relation to extracting hydrocarbons and other natural resources from subterranean formations. More specifically, but not by way of limitation, this disclosure relates to using non-fungible tokens (NFTs) stored on a digital ledger, such as a blockchain, for controlling ownership of well log data.

BACKGROUND

A well system can include one or more wellbores for extracting hydrocarbons and other natural resources from a subterranean formation. To assist in extraction operations, well operators may generate detailed records describing properties of the geologic formations penetrated by a wellbore. These detailed records can be referred to as well logs, and the data therein can be referred to as well log data. Well logs can be generated in multiple ways. For example, well logs can be generated by visually analyzing samples of the geologic formations. Well logs can also be generated by taking physical measurements of the geologic formations using instruments lowered into the wellbore.

Well logs can be generated during any phase of a wellbore's lifecycle, such as during drilling, completion, production, or abandonment. For example, well logs can be generated during the drilling phase in a process referred to as logging-while-drilling (LWD). LWD can involve lowering specialized instruments into the wellbore, where the instruments include sensors for measuring properties of the geologic formation surrounding the wellbore. Examples of such properties can include density, porosity, resistivity, magnetic resonance, compressional slowness, shear slowness, and formation pressure. The well logs may then be provided to analysts (e.g., geophysicists) that can study the properties of the geologic formation to make decisions relating to the ongoing drilling operations or future well operations.

DETAILED DESCRIPTION

Figure 1:
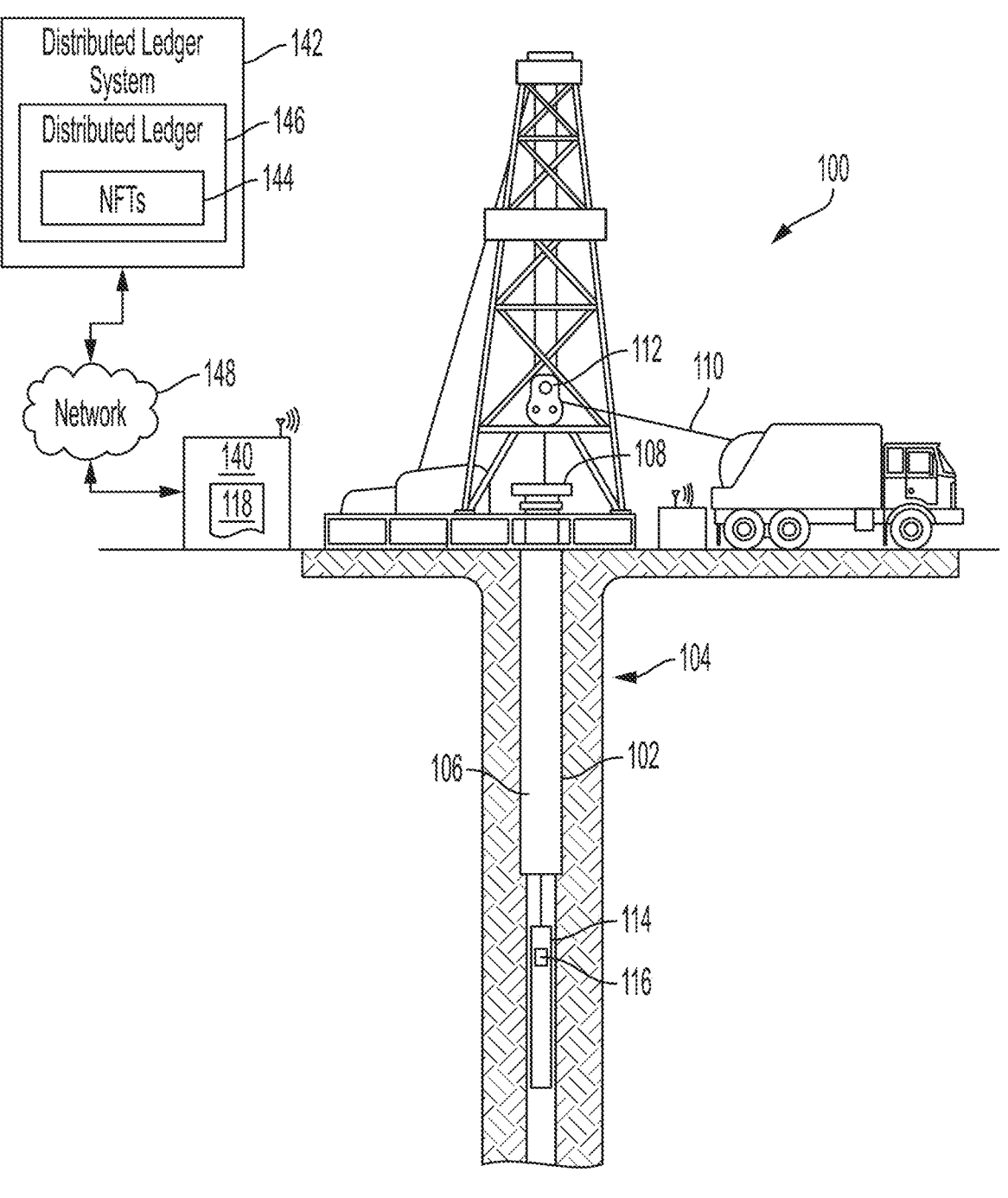
FIG. 1 depicts an example of a well system usable to generate well logs according to some aspects of the present disclosure.

Certain aspects and features of the present disclosure relate to controlling ownership of well log data using non-fungible tokens (NFTs) stored on a digital ledger. An NFT is a unique object such as a cryptographic token, which is recorded on a digital ledger to represent a unique physical or digital asset. NFTs each have their own unique information and attributes, so they are not mutually interchangeable with other NFTs. This makes NFTs different from fungible assets like cryptocurrencies, in that fungible assets are identical to each other and therefore can be traded or exchanged as identical units. Given the uniqueness of each NFT, NFTs can be used in some examples as certificates of authenticity and proof of ownership for well log data.

In some cases, well log data may be considered confidential or proprietary. To avoid unintentional public disclosure of such confidential material, in some examples the well log data may be stored in an encrypted manner on the digital ledger or in another storage location, such as a website or file server. This encryption may help protect the well log data, for example if the digital ledger or other storage location is publicly accessible. A decryption key may then be selectively provided to designated users (e.g., that purchase or license the well log data) to grant them access to the well log data in a controlled manner.

Digital assets like well log data are being created at an exponentially increasing rate. But it is particularly difficult to maintain control over digital assets because they are easily copied and shared. Unlike physical assets (e.g., land or vehicles) that are relatively easy to control, digital assets are formed from digital data that can be readily copied and shared with a potentially unlimited number of individuals with a few clicks of the mouse. This makes digital assets highly vulnerable to unauthorized exposure and use, which can be particularly problematic for proprietary or confidential information like well log data. The ease with which digital assets can be copied and shared can also make it challenging to track ownership of such digital assets, since many copies of a digital asset may exist and many users may have access to the copies at the same time. This may be particularly true for well log data, which is often copied and shared among multiple companies, systems, and individuals, such as engineers, geophysicists, and managers, over the course of a well's lifecycle.

Some examples of the present disclosure can overcome one or more of these problems by generating NFTs that represent well log data on a digital ledger to help manage ownership of the well log data. Additionally, access to the well log data can be controlled via encryption techniques and smart contracts. The NFTs can be transferred between parties to transfer ownership of the corresponding well log data among the parties. For example, an owner of well log data may wish to sell the well log data to another party in exchange for a fee. To do so, the current owner can initiate a transfer of an NFT representing the well log data to the new owner on the digital ledger. This transfer can be facilitated by publishing a new record of the transaction on the digital ledger. The transaction details may show the transfer of the NFT from a first digital wallet of the current owner to a second digital wallet of the new owner.

In some examples, an NFT representing well log data can be owned by multiple parties, such that ownership of the asset can be split multiple ways among the parties. To effectuate this joint ownership, the system can store metadata in corresponding to the NFT that describes the joint ownership. The metadata may be stored on the digital ledger or in another location, such as a database. The NFT metadata can include unique identifiers (e.g., usernames or wallet addresses) for the co-owners of the asset. Each co-owner's ownership interest may also be specified in the metadata, for example in terms of ownership percentage or fraction. Each co-owner may have the capability of transferring their ownership interest to a third party, without impacting the ownership interests of the other owners. This may be achieved by publishing a new record on the digital ledger that includes transaction details representing the transfer of the current owner's ownership interest in the well log data to the third party.

In some examples, an online marketplace can be established to facilitate the easy creation and transfer (e.g., sale) of NFTs representing well log data. The marketplace may be searchable by users to locate well log data that matches their search criteria, at which point the users may be able to purchase or license the well log data from its current owner. To enable this search functionality, the NFTs may be assigned tags that characterize the well log data. The tags for an NFT can be stored as part of the metadata of the NFT. The tags for an NFT may be assigned by the NFT creator or another entity. The tags may be stored in an unencrypted manner to allow them to be readily searched by the system. The system can analyze the tags based on the search criteria to filter through the NFTs and provide relevant search results to the user.

In some examples, the digital ledger can be a distributed database that is duplicated and shared across a network of computer nodes that collectively validate (e.g., approve or reject) transactions. This collective validation can improve the security and reliability of the digital ledger. One example of such a distributed ledger can include a blockchain, though other types of distributed digital ledgers are contemplated herein. A blockchain is a shared, decentralized digital ledger that can facilitate the process of recording transactions and tracking asset ownership. A blockchain contains a sequential series of immutable records referred to as "blocks." Each block is distinct from the block before it and linked to the prior block via a hashed pointer, thereby creating a sequential chain of blocks or "blockchain." The immutability of the blocks allows the blockchain to serve as a trusted record of transactions.

In some examples, ownership of the well log data and access to the well log data can be governed by smart contracts. A smart contract is a self-executing contract or self-enforcing agreement in the form of executable program code, which may reside on the digital ledger or in another location such as a database. A smart contract can be automatically executed by the network of computer nodes that is hosting the digital ledger in response to certain events, such as when predetermined terms and conditions are met or when an agreement is reached between participating parties. The smart contracts may allow an owner of well log data to set terms and conditions that govern ownership of and access to the corresponding well log data. For example, the owner of the well log data may select among a list of available smart contracts to automatically sell or license the well log data to one or more recipients in response to certain conditions being satisfied, like the payment of a fee. In the case of a licensing arrangement, the fee may be a subscription fee that may be periodically invoiced and paid via the smart contract. Smart contracts may also be used to govern royalty payments and confidentiality in relation to the well log data. For example, smart contracts may allow the owner of private (e.g., confidential) well-log data to automatically make the well log data public on a particular date or after a preset time period has passed.

These illustrative examples are provided to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

FIG. 1 depicts an example of a well system 100 usable to generate well logs according to some aspects of the present disclosure. The well system 100 includes a wellbore 102 extending through various earth strata of a hydrocarbon bearing subterranean formation 104. A casing string 106 extends from the well surface 108 to the subterranean formation 104. The casing string 106 can provide a conduit through which formation fluids, such as production fluids produced from the subterranean formation 104, can travel from the wellbore 102 to the well surface 108. The casing string 106 can be coupled to the walls of the wellbore 102 via cement. For example, a cement sheath can be positioned or formed between the casing string 106 and the walls of the wellbore 102 for coupling the casing string 106 to the wellbore 102.

The well system 100 can include one or more well tools, such as well tool 114. In the example shown in FIG. 1, the well tool 114 is positioned in the wellbore 102 by a guide 110 (e.g., a wireline, slickline, or coiled tube) and winch 112 for performing the well operations downhole. But in other examples, the well tool 114 may be positioned in the wellbore 102 in another manner. For example, the well tool 114 may be part of drill string for drilling the wellbore 102 and conveyed downhole during drilling operations.

The well tool 114 can be configured to generate one or more well logs 118. For example, the well tool 114 can be a logging-while-drilling (LWD) tool. The well tool 114 can include a sensor package 116 for measuring properties of the formation proximate to the wellbore 102. The well tool 114 can generate the well logs 118 based on the measured properties. For example, the well tool 114 can measure the electrical properties, acoustic properties, radioactive properties, electromagnetic properties, pressure properties, or any combination of these, with respect to the strata regions proximate to wellbore 102. The well tool 114 can then generate one or more well logs 118 based on the measured properties. A single well log may include multiple different types of measured properties or just a single type of measured property.

Having generated the well logs 118, the well tool 114 can electronically communicate the well logs 118 to a computing device 140, which can be positioned onsite (as shown in FIG. 1) or offsite. The well tool 114 can electrically communicate with the computing device 140 via a wired or wireless interface. In some examples, the well tool 114 can indirectly communicate the well logs 118 to the computing device 140, for example by communicating the well logs 118 over a network or through another intermediary.

While all the well logs 118 in this example pertain to the same wellbore 102, it will be appreciated that many well logs may be created in relation to the same or different wellbores by the same or different entities. And it may be desirable to control ownership and access to some or all of these well logs. To that end, the computing device 140 may interface with a distributed ledger system 142 in some examples to generate NFTs 144 in relation to the well logs on a distributed ledger 146. For example, the computing device 140 may be part of the distributed ledger system 142 or communicatively coupled with the distributed ledger system 142 via a network 148, such as the Internet. Either way, the computing device 140 can interact with the distributed ledger system 142 to generate the NFTs 144 on a digital ledger in relation to the well logs 118.

Figure 2:
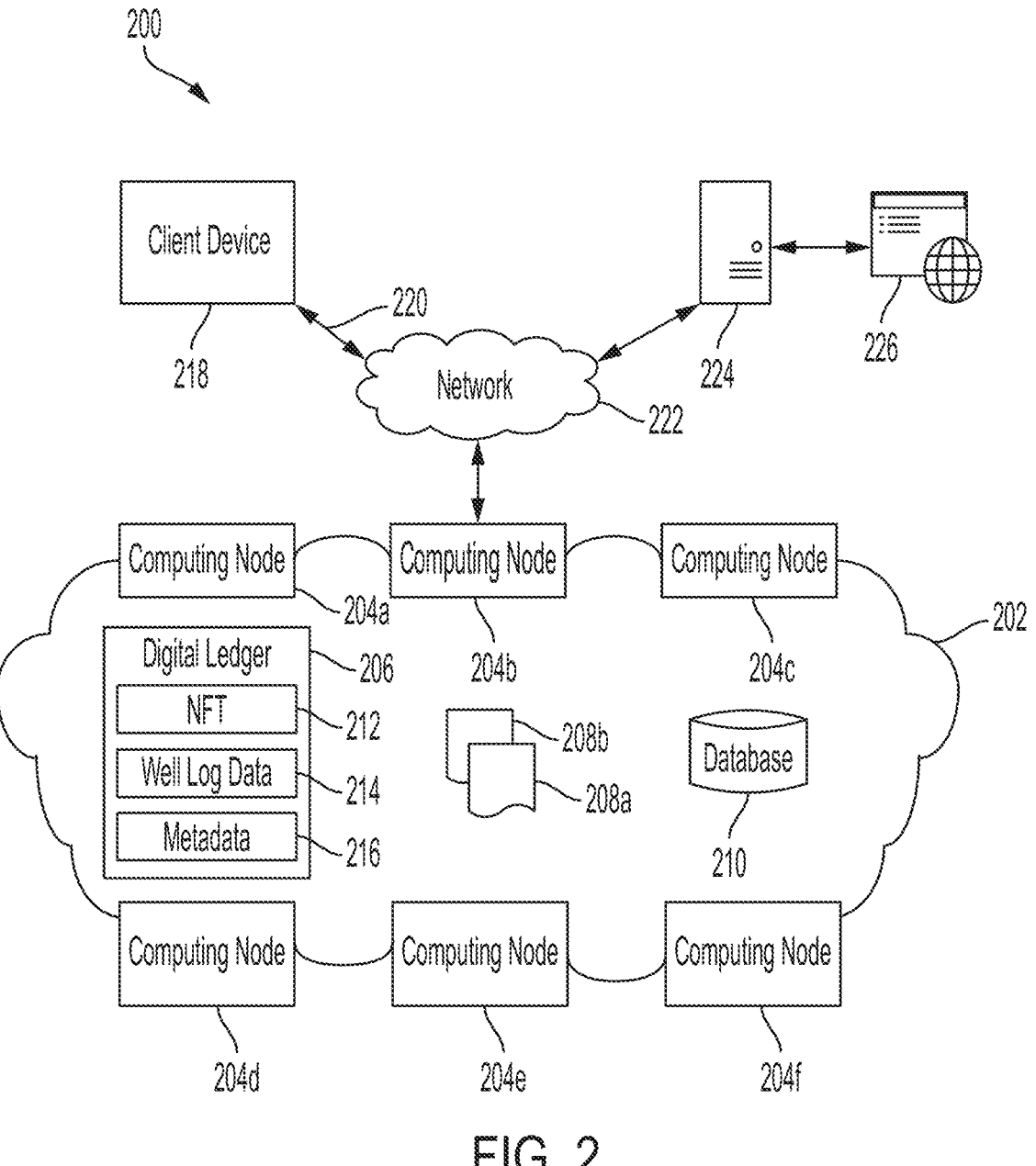
FIG. 2 depicts a block diagram of an example of a computer system for implementing a digital ledger according to some aspects of the present disclosure.

FIG. 2 depicts a block diagram of an example of a computer system 200 for implementing a digital ledger 206 usable to track NFTs for well log data according to some aspects of the present disclosure. The computer system 200 may include the distributed ledger system 142 described above and the digital ledger 206 may correspond to the distributed ledger 146 described above. The computer system 200 can include any number and combination of computing nodes, such as computing nodes 104a-f. Examples of the computing nodes can include desktop computers, servers, and specialized mining computers such as application-specific integrated circuit (ASIC) miners. The computing nodes can collectively implement a ledger network 202 to host the digital ledger 206, which in this example is a distributed digital ledger. One example of the ledger network 202 can be a blockchain network in the context of a blockchain. The computing nodes 104a-f may be distributed among and operated by one or more participants of the ledger network 202, such as various companies associated with the oil and well industry.

The digital ledger 206 can provide an immutable record related to ownership of well log data. To facilitate use of the digital ledger 206, in some examples the computing nodes 104a-f can each have access to a respective copy of the digital ledger 206 and use their respective copies to validate transactions on the digital ledger 206. Examples of such transactions may include the transfer or licensing of well log data from one entity to another entity. In some examples, the computing nodes 104a-f can validate transactions by consensus, in which a new record is only added to the digital ledger 206 if many (e.g., a majority) of the computing nodes 104a-f agree that the record should be added. The computing nodes 104a-f may employ one or more consensus algorithms to reach such a consensus. Examples of the consensus algorithms can include proof of work, proof of stake, practical byzantine fault tolerance, proof of burn, proof of history, etc.

In some examples, well log data can be represented on the digital ledger 206 by an NFT. As one example, an entity may have well log data 214 and wish to track ownership of the well log data 214 using the digital ledger 206. To that end, the entity can operate a client device 218 (e.g., a laptop computer, desktop computer, server, mobile phone, or tablet) to transmit a request 220 to an online portal 226 associated with the ledger network 202. The online portal 226 may be a web-based portal or another type of portal for allowing users to generate NFTs for well log data. The client device 218 can transmit the request 220 via a network 222, such as the Internet, that may be distinct from the ledger network 202. The request 220 can be received by a server 224 hosting the online portal 226. The server 224 may be internal or external to the ledger network 202. In response to receiving the request 220, the server 224 can interface with the ledger network 202 to generate an NFT 212 representing the well log data 214. For example, the server 224 can interact with one or more of the computing nodes 204a-f via the network 222 to initiate the generation of the NFT 212. The ledger network 202 can respond to said interactions by generating and storing the NFT 212 on the digital ledger 206. For example, the computing node 204a can generate a new record that includes the NFT 212 and coordinate with the other computing nodes 204 b-f in the ledger network 202 to add the new record to the digital ledger 206.

The ledger network 202 can also store a reference to the well log data 214 on the digital ledger 206 and in relation to the NFT 212. For example, the ledger network 202 can store the reference in the new record containing the NFT 212. In some examples, the reference may be the well log data 214 itself. In some such examples, the user may be able to upload the well log data 214 via the online portal 226 for storage on the digital ledger 206. Alternatively, the reference can identify a storage location from which the well log data 214 can be retrieved, where the storage location is external to the digital ledger 206 and may be external to the ledger network 202. For example, the storage location can be a uniform resource indicator (URI) indicating the address of a website, repository, or server from which the well log data 214 can be retrieved. The user may be able to input the reference via the online portal 226 for use by the ledger network 202.

In some cases, the well log data 214 can be confidential or otherwise intended to be kept secret from the public. But, the digital ledger 206, or another storage location for the well log data 214, may be publicly accessible. It may therefore be desirable to protect the well log data 214 from intentional or unintentional public disclosure. To that end, in some examples, the ledger network 202 can encrypt the well log data 214 using one or more encryption techniques prior to storing the well log data 214 in the storage location. For example, the computing node 204a can encrypt the well log data 214 using an encryption technique to generate encrypted well-log data. The computing node 204a may then only store the encrypted well-log data, and not the unencrypted well log data 214, on the digital ledger 206. The encryption techniques may include asymmetric encryption techniques or symmetric encryption techniques. Examples of asymmetric encryption techniques can include Rivest Shamir Adleman (RSA), the Digital Signature Standard (DSS), Elliptical Curve Cryptography (ECC), etc. Examples of symmetric encryption techniques can include Advanced Encryption Standard (AES), Data Encryption Standard (DES), International Data Encryption Algorithm (IDEA), Blowfish, and Rivest Cipher 4 (RCV4). Encrypting the well log data 214 can obfuscate it from the public or other unintended parties.

In some examples, the ledger network 202 can compress the well log data 214 using one or more compression techniques prior to storing the well log data 214 in the storage location. This compression may be performed additionally or alternatively to the encryption described above. For example, the computing node 204a can compress the well log data 214 using a compression technique to generate compression well-log data. The computing node 204a may then only store the compressed well-log data, and not the uncompressed well log data 214, on the digital ledger 206. Examples of the compression techniques can include Huffman coding, arithmetic coding, Burrows-Wheeler transform, Lempel-Zic compression, run-length encoding, etc. Compressing the well log data 214 may be particularly useful in situations in which the well log data 214 is stored on the digital ledger 206, since the same well log data 214 may be copied many times into many records over its lifespan on the digital ledger 206. By compressing the well log data 214, the size of the digital ledger 206 may be reduced and consumption of computing resources (e.g., CPU, memory, and storage) by the ledger network 202 may also be reduced. This compression can also yield faster transaction times because it may allow for record sizes (e.g., block sizes in the context of a blockchain) to be reduced.

The ledger network 202 may also generate other information associated with the well log data 214. For example, the ledger network 202 may generate metadata 216 indicating current ownership of the NFT 212, which can serve as a proxy for ownership of the well log data 214. The metadata 216 may also include one or more tags characterizing the well log data 214. For example, the tags may indicate a type, geographical location, measurement depth, creation date, or another property associated with the well log data 214. The tags may additionally or alternatively indicate information about the process of obtaining the well log data 214, such as what type of measurement tool was used to obtain the well log data 214. After generating the metadata 216, the ledger network 202 can store the metadata 216 in any suitable location. For example, the ledger network 202 can store the some or all of the metadata 216 on the digital ledger 206 in relation to the NFT 212. In some such examples, some or all of the metadata 216 can be stored in the new record establishing the NFT 212. Additionally or alternatively, the ledger network 202 can store some or all of the metadata 216 in a database 210 or in another location that is external to the digital ledger 206.

Figure 3:
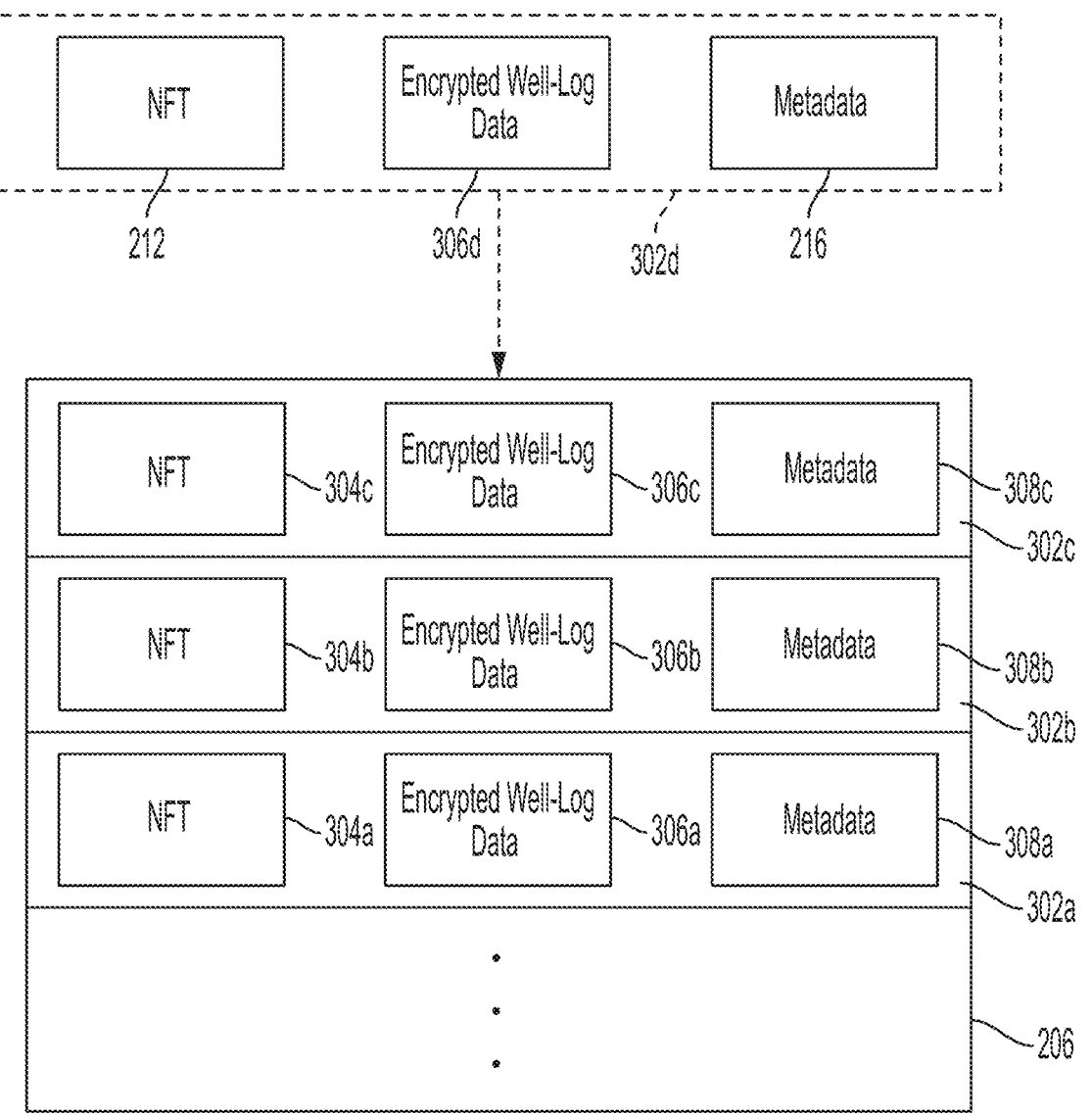
FIG. 3 depicts an example of a digital ledger that includes non-fungible tokens according to some aspects of the present disclosure.

One example of the digital ledger 206 is shown in FIG. 3. In this example, the digital ledger 206 includes multiple records 302*a*-*c*. Each of the records 302*a*-*c* includes an NFT 304*a*-*c*, an encrypted version of the corresponding well log data 306*a*-*c*, and the metadata 308*a*-*c* associated with the well log data 306*a*-*c*. Each of the records may also include additional information (not shown for simplicity), such as a header value, a hash of the previous record's header value, a root of a hash tree (e.g., a Merkle tree), or any combination of these. As shown in FIG. 3, a new record 302*d* can be added to an end of the digital ledger 206 for the NFT 212. The new record 302*d* can include the NFT 212, an encrypted version of the well log data 214, the metadata 216, and other information. Of course, this example is intended to be illustrative and non-limiting. Other examples may include more, less, or different information than is shown in the records 302*a*-*d*. For instance, other examples may exclude the encrypted well-log data 306*a*-*d* or the metadata 308*a*-*c* from some or all of the records 302*a*-*d*. Other examples may also store the well log data in an unencrypted format in some or all of the records 302*a*-*d*.

Continuing with FIG. 2, once the NFT 212 has been generated (or "minted") on the digital ledger 206, in some examples the ledger network 202 can transmit a response to the request 220 indicating that the NFT 212 has been generated. At this stage, the NFT 212 can serve as proof of ownership of the corresponding well log data 214 on the digital ledger 206.

In some examples, the ledger network 202 can execute one or more smart contracts 208*a*-*b* in relation to the NFT 212. Any number of smart contracts may be executable in relation to a given NFT 212. The smart contracts 208*a*-*b* can be used to automatically govern ownership of, access to, and payments related to the well log data 214. For example, smart contract 208*a* may enable a user to purchase ownership of the well log data 214 automatically, without needing further intervention by the current owner. In some cases, the purchase may be approved in exchange for payment of a fee or for the provision of a service. To enable this functionality, the smart contract can include program code that is executable to automatically generate a new record on the digital ledger 206 that transfers ownership of the corresponding NFT 212 from the current owner to the purchaser, for example in response to detecting the fee payment. If the well log data 214 is encrypted, the smart contract 208*a* may also decrypt the encrypted well-log data and provide decrypted data to the purchaser for use. The smart contract 208*a* can provide the decrypted data to the purchaser via e-mail or another electronic communications-medium.

Alternatively, the smart contract 208*a* may provide the decryption key to the purchaser for use in decrypting the well log data themselves.

As another example, smart contract 208*b* can automatically grant a license to an entity to use the well log data 214, without needing further intervention by the current owner. In some cases, the license may be granted to the entity in exchange for payment of a fee or for the provision of a service. To enable this functionality, the smart contract 208*b* can include program code that is executable to automatically add a new record to the digital ledger 206 or update the database 210 to reflect the license to the purchaser, for example in response to detecting the fee payment. If the well log data 214 is encrypted, the smart contract 208*b* may also decrypt the encrypted well-log data and provide the decrypted data to the licensee for use. Alternatively, the smart contract 208*b* may provide the decryption key to the licensee for use in decrypting the well log data themselves.

In the above licensing example, the license may be valid for a predefined licensing period (e.g., six months). So, the license may be automatically revoked by the smart contract 208*b* upon completion of that time period. For example, the smart contract 208*b* can include program code that is executable to automatically add a new record to the digital ledger 206 or update the database 210 to reflect that the license is revoked, in response to detecting the completion of the licensing period. If a decryption key for the well log data 214 was provided to the licensee to provide the licensee with access to the well log data 214, once the license is revoked, the smart contract 208*b* can be configured to automatically re-encrypt the well log data 214 using a different key, so that the licensee can no longer access the data. But the licensee may also be able to renew the license, for example using an automated subscription service implemented using the smart contract 208*b*.

In some examples, a smart contract 208*a* can automatically govern whether the well log data 214 is kept private or made public. For example, the smart contract 208*a* can include program code that is executable to automatically decrypt the well log data 214 or otherwise make the well log data 214 accessible to the public on a predefined date or after a predefined time period has passed.

The smart contracts 208*a*-*b* may be stored in any suitable location accessible to the ledger network 202. For example, some or all of the smart contracts 208*a*-*b* may be stored on the digital ledger 206. Additionally or alternatively, some or all of the smart contracts 208*a*-*b* may be stored in the database 210. Regardless of their location, the smart contracts 208*a*-*b* can be accessed and executed by the ledger network 202. In some examples, the smart contracts 208*a*-*b* may be executed by one computing node 204*a* of the ledger network 202. In other examples, the smart contracts 208*a*-*b* may be executed by two or more of the computing nodes 204*a*-*f* working in cooperation.

In some examples, the smart contracts 208*a*-*b* that are applicable to a particular NFT 212 can be selected by its owner (e.g., the original or current owner). These selections can be made at the time the NFT 212 is created or at a later point in time via the online portal 226. The owner can update the list of applicable smart contracts 208*a*-*b* as desired, for example by adding additional smart contracts to or removing one or more existing smart contracts 208*a*-*b* from the list. In some examples, the owner can also customize the specific parameters usable by the smart contracts 208*a*-*b* in relation to their particular NFT 212, since the same smart contracts 208*a*-*b* may be executable in relation to multiple NFTs. Examples of such customizable parameters can include a purchasing cost, a licensing fee, a licensing period, an encryption or decryption method, auction options if the NFT 212 is to be sold by auction, or any combination of these. In other examples, the parameters may be fixed at the creation of the NFT 212 and unchangeable thereafter. In either case, the parameters may form part of the metadata 216 stored by the ledger network 202 in relation to the NFT 212.

In some examples, the online portal 226 can include an online marketplace for buying, licensing, and selling well log data. The marketplace may be searchable by users to locate well log data that matches their search criteria. This search functionality may be facilitated by the tags in the metadata 216, as described above. The tags may be stored in an unencrypted manner to allow them to be readily searched. The tags can be analyzed based on the search criteria to filter through NFTs and provide relevant search results to the requestor. For example, the server 224 may receive a search request from a client device, where the search request is for identifying well log data associated with particular geographical coordinates (e.g., latitude and longitude coordinates). In response to receiving the search request, the server 224 can filter through the tags assigned to a set of NFTs to identify which of the NFTs are associated with the particular geographical coordinates. The server 224 can then output the identified NFTs as the search results. Alternatively, the server 224 can forward the search request to a part of the ledger network 202, such as to computing node 204b. In response to receiving the search request, the ledger network 202 can perform the search and return the search results to the server 224, which can in turn can provide them back to the client device.

In some examples, one or more aspects of the system 200 may be implemented using cloud computing. Cloud computing can involve providing on-demand access to a shared pool of computing resources, such as computing power and data storage. As one specific example, the server 224 may be part of a cloud computing system for implementing the online portal 226. As another example, one or more of the computing nodes 204a-f may be part of one or more cloud computing systems. Cloud computing can yield improvements to robustness, scalability, and speed as compared to conventional approaches.

Although FIG. 2 shows a certain number and arrangement of components, this is intended to be illustrative and non-limiting. Other examples may include more components, fewer components, different components, or a different arrangement of the components shown in FIG. 2. For instance, the server 224 may be part of the ledger network 202 or the database 210 may be external to the ledger network 202 in other examples. Any suitable arrangement of the depicted components is contemplated herein.

Figure 4:
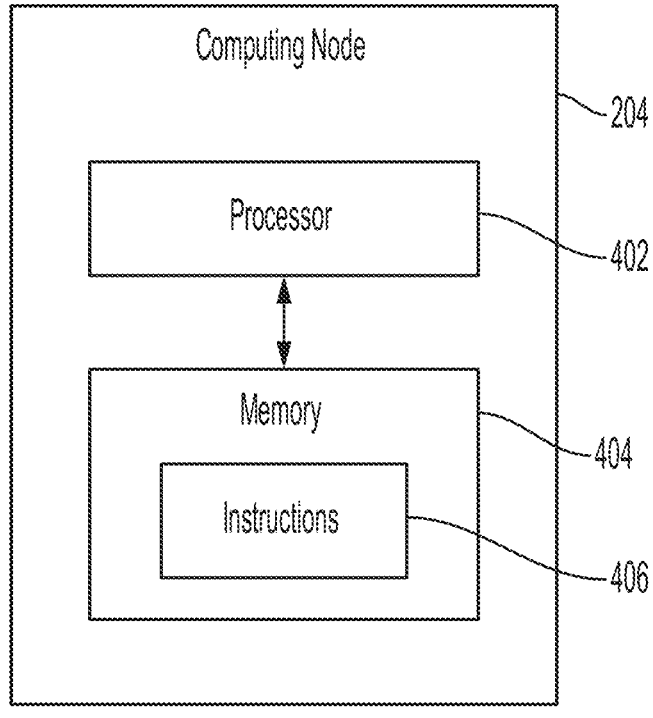
FIG. 4 depicts a block diagram of an example of a computing device for implementing some aspects of the present disclosure.

FIG. 4 is a block diagram of an example of a computing device 400 for implementing some aspects of the present disclosure. The computing device 400 may correspond to any of the computer nodes 204a-f or the server 224 described above.

The computing device 400 can include a processor 402 communicatively coupled to a memory 404. The processor 402 is hardware that can include one processing device or multiple processing devices. Non-limiting examples of the processor 402 include a Field-Programmable Gate Array (FPGA), an application-specific integrated circuit (ASIC), or a microprocessor. The processor 402 can execute instructions 406 stored in the memory 404 to perform computing operations. The instructions 406 may include processor-specific instructions generated by a compiler or an interpreter from code written in any suitable computer-programming language, such as C, C++, C#, Python, or Java.

The memory 404 can include one memory device or multiple memory devices. The memory 404 can be volatile or can be non-volatile, such that it can retain stored information when powered off. Some examples of the memory 404 can include electrically erasable and programmable read-only memory (EEPROM), flash memory, or any other type of non-volatile memory. At least some of the memory 404 includes a non-transitory computer-readable medium from which the processor 402 can read instructions 406. A computer-readable medium can include electronic, optical, magnetic, or other storage devices capable of providing the processor 402 with computer-readable instructions or other program code. Some examples of a computer-readable medium include magnetic disks, memory chips, ROM, random-access memory (RAM), an ASIC, a configured processor, optical storage, or any other medium from which a computer processor can read the instructions 406.

In some examples, the processor 402 can execute the instructions 406 to implement some or all of the functionality described herein. For example, the processor 402 cooperate with one or more computing nodes of a ledger network to operate a digital ledger on which NFTs associated with well log data can be stored and transferred among owners. Additionally, the processor 402 may cooperate with the one or more computing nodes to execute smart contracts, generate the online portal described above, and perform other functionality.

Figure 5:
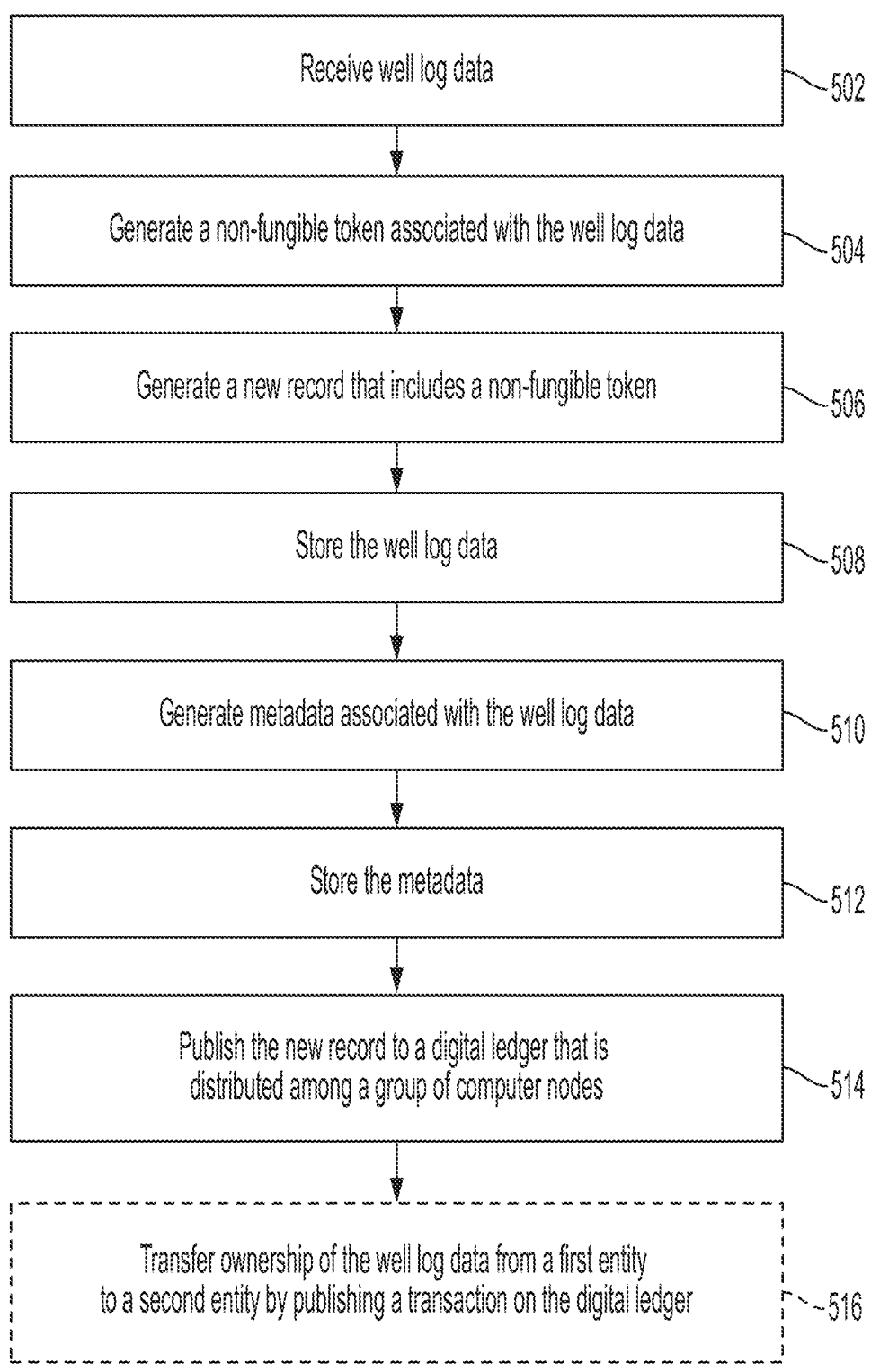
FIG. 5 depicts a flow chart of an example of a process for storing a non-fungible token in relation to well log data on a digital ledger according to some aspects of the present disclosure.

In some examples, the processor 402 can implement the process shown in FIG. 5 for storing a non-fungible token in relation to well log data on a digital ledger. Other examples may include more operations, fewer operations, different operations, or a different order of the operations shown in FIG. 5. The operations of FIG. 5 are described below with reference to the components of FIG. 1 described above.

In block 502, a processor 402 receives well log data. The processor 402 can receive the well log data directly or indirectly from a well tool, such as the well tool 114 of FIG. 1. The processor 402 can receive the well log data in its original format from the well tool or in a pre-processed form.

In block 504, the processor 402 generates a non-fungible token (NFT) associated with the well log data. The NFT can include a unique string of numbers, characters, or both. The NFT may be generated using a hashing scheme, a pseudo-random number generator, or both.

In block 506, the processor 402 generates a new record for a digital ledger, where the new record includes the NFT. The new record may also include other transaction details, such as a public key, an address corresponding to a smart contract usable to create (e.g., mint) the NFT, a fee amount payable for creating the NFT, etc.

In block 508, the processor 402 stores the well log data. The well log data can be stored internally or externally to the new record. For example, the processor 402 can store at least some of the well log data in the new record, so that the well log data is part of the new record. Additionally or alternatively, the processor 402 can store at least some of the well log data in a storage location that is external to the new record and the digital ledger. Examples of such a storage location may include a file server, a website, or a repository that is distinct from the digital ledger. A reference to the storage location may then be included in the new record.

In some examples, the well log data can be stored in a modified format. For example, the well log data can be stored in the target location in a compressed format, an encrypted format, or both. Whether the well log data is stored in a modified format may be a prefixed or customizable decision. For example, the entity that owns the well log data may be able to select one or more customizable options for storing the well log data in an encrypted or compressed format as desired.

In block 510, the processor 402 generates metadata associated with the well log data. In some examples, the metadata may include tags or other descriptors characterizing the well log data. The processor 402 may generate the metadata based on user input. For example, a user may supply the tags or other descriptors, from which the processor 402 can generate the metadata. Additionally or alternatively, the processor 402 can generate the metadata based on other factors. For example, the processor 402 can analyze the well log data to automatically determine the descriptors (e.g., tags). This may involve analyzing the variables and variable values in the well log data. In some such examples, the processor 402 can provide the automatically determined descriptors as recommendations to the user for confirmation. The user can then confirm or alter the recommended descriptors as desired, at which point the metadata can be generated by the processor 402.

In block 512, the processor 402 stores the metadata. The metadata can be stored internally or externally to the new record. For example, the processor 402 can store at least some of the metadata in the new record, so that the metadata is part of the new record. Additionally or alternatively, the processor 402 can store at least some of the metadata in a storage location that is external to the new record. Examples of such a storage location may include a database, a website, or a repository. A reference to the storage location may then be included in the new record.

In some examples, the metadata can be stored in a modified format. For example, the metadata can be stored in a compressed format, an encrypted format, or both. Whether the metadata is stored in a modified format may be a prefixed or customizable decision. For example, the entity that owns the well log data may be able to select one or more customizable options for storing the metadata in an encrypted or compressed format as desired.

In block 514, the processor 402 publishes the new record to the digital ledger, where distributed ledger is distributed among a group of computer nodes. For example, the processor 402 can digitally sign the new record using a private key of an asymmetric key pair and transmit the new record to some or all of the other computer nodes for validation. Once validated, the processor 402 can then publish the new record to the digital ledger. In some examples, this validation can involve at least a subset of the computer nodes reaching a consensus decision to add the new record to the digital ledger. The consensus decision can be governed by one or more consensus algorithms, as described above.

Once the NFT has been created and stored on the digital ledger, it may be desirable to transfer ownership of the well log data from a first entity to a second entity. The first entity can be the current owner of the well log data and the second entity can be a new owner of the well log data. To effectuate this transfer, the processor 402 can add another record to the digital ledger describing a transaction of the NFT from a first digital wallet of the first entity to a second digital wallet of the second entity. This optional step is shown in block 516 of FIG. 5. Because the NFT serves as a proxy for the well log data, transferring the NFT from the first digital wallet to the second digital wallet can serve to transfer ownership of the well log data from the first entity to the second entity.

In some examples, the well log data can be used by an automated system to control a well operation. For example, a first entity can generate the well log data in relation to a particular wellbore. The well log data can serve as a record of the properties of the geologic formations penetrated by the particular wellbore. The first entity can then generate an NFT for the well log data on a digital ledger in accordance with some aspects described herein. At a later point in time, the first entity may grant a second entity access to the well log data (e.g., by transferring ownership of, a license for, the well log data to the second entity). In response to receiving access to the well log data, an automated system of the second entity may obtain and analyze the well log data. Based on a result of the analysis, the automated system may transmit one or more commands for controlling a well operation in a target wellbore, which may be the same as or different from the original wellbore from which the well log data was obtained. For example, the automated system can transmit commands configured to control a drill string that is performing a drilling operation in the target wellbore. In this way, the drilling operation may be automatically informed by the well log data from the first entity. As another example, the automated system can transmit commands configured to control a valve or another component of a production operation in the target wellbore. In this way, the production operation may be automatically informed by the well log data from the first entity.

In some aspects, non-fungible tokens stored on a digital ledger can be used to control ownership of well log data according to one or more of the following examples. As used below, any reference to a series of examples is to be understood as reference to each of those examples disjunctively (E.g., "Examples 1-4" is to be understood as Examples 1, 2, 3, or 4").

Example #1: A system including one or more processors and one or more memories including program code that is executable by the one or more processors for causing the one or more processors to perform operations. The operations can include encrypting well log data to generate encrypted well-log data; generating a new record that associates a non-fungible token with the encrypted well-log data, the non-fungible token being usable to track ownership of the well log data; and publishing the new record to a digital ledger that is distributed among a plurality of computer nodes of a ledger network in response to at least a subset of the computer nodes reaching a consensus decision to add the new record to the digital ledger.

Example #2: The system of Example #1 may feature the one or more memories further including program code that is executable by the one or more processors for causing the one or more processors to: execute a smart contract to determine that a predetermined condition has been satisfied and consequently provide a target user with access to the well log data, wherein providing the target user with access to the well log data involves transmitting a decryption key for decrypting the encrypted well-log data to the target user.

Example #3: The system of any of Examples #1-2 may feature the one or more memories further including program code that is executable by the one or more processors for causing the one or more processors to transfer ownership of the well log data from a first user to a second user by publishing another record to the digital ledger that transfers ownership of the non-fungible token from a first digital account of the first user to a second digital account of the second user.

Example #4: The system of any of Examples #1-3 may feature the one or more memories further including program code that is executable by the one or more processors for causing the one or more processors to generate an online digital marketplace for buying, licensing, and selling a plurality of well logs, wherein each well log of the plurality of well logs is represented by a corresponding non-fungible token on the digital ledger.

Example #5: The system of Example #4 may feature the online digital marketplace being searchable by a user to identify a subset of well logs, from among the plurality of well logs, having assigned tags that match a search criterion.

Example #6: The system of any of Examples #1-5 may feature the one or more memories further including program code that is executable by the one or more processors for causing the one or more processors to: store the encrypted well-log data at a storage location that is separate from the digital ledger; and store a reference to the storage location in the new record.

Example #7: The system of any of Examples #1-6 may feature the one or more memories further including program code that is executable by the one or more processors for causing the one or more processors to store the encrypted well-log data in the new record in conjunction with the non-fungible token.

Example #8: A computer-implemented method including encrypting well log data to generate encrypted well-log data; generating a new record that associates a non-fungible token with the encrypted well-log data, the non-fungible token being usable to track ownership of the well log data; and publishing the new record to a digital ledger that is distributed among a plurality of computer nodes of a ledger network in response to at least a subset of the computer nodes reaching a consensus decision to add the new record to the digital ledger.

Example #9: The method of Example #8 may include executing a smart contract to determine that a predetermined condition has been satisfied and consequently provide a target user with access to the well log data, wherein providing the target user with access to the well log data involves transmitting a decryption key for decrypting the encrypted well-log data to the target user.

Example #10: The method of any of Examples #8-9 may include transferring ownership of the well log data from a first user to a second user by publishing another record to the digital ledger that transfers ownership of the non-fungible token from a first digital account of the first user to a second digital account of the second user.

Example #11: The method of any of Examples #8-10 may include generating an online digital marketplace for buying and selling a plurality of well logs, wherein each well log of the plurality of well logs is represented by a corresponding non-fungible token on the digital ledger.

Example #12: The method of Example #11 may include the online digital marketplace being searchable by a user to identify a subset of well logs, from among the plurality of well logs, having assigned tags that match a search criterion.

Example #13: The method of any of Examples #8-12 may include storing the encrypted well-log data at a storage location that is separate from the digital ledger; and storing a reference to the storage location in the new record.

Example #14: The method of any of Examples #8-13 may include storing the encrypted well-log data in the new record in conjunction with the non-fungible token.

Example #15: The method of any of Examples #8-13 may include generating the non-fungible token.

Example #16: A non-transitory computer-readable medium comprising program code that is executable by one or more processors for causing the one or more processors to perform operations. The operations can include encrypting well log data to generate encrypted well-log data; generating a new record that associates a non-fungible token with the encrypted well-log data, the non-fungible token being usable to track ownership of the well log data; and publishing the new record to a digital ledger that is distributed among a plurality of computer nodes of a ledger network in response to at least a subset of the computer nodes reaching a consensus decision to add the new record to the digital ledger.

Example #17: The non-transitory computer-readable medium of Example #16 may include program code that is executable by the one or more processors for causing the one or more processors to: execute a smart contract to determine that a predetermined condition has been satisfied and consequently provide a target user with access to the well log data, wherein providing the target user with access to the well log data involves transmitting a decryption key for decrypting the encrypted well-log data to the target user.

Example #18: The non-transitory computer-readable medium of any of Examples #16-17 may include program code that is executable by the one or more processors for causing the one or more processors to transfer ownership of the well log data from a first user to a second user by publishing another record to the digital ledger that transfers ownership of the non-fungible token from a first digital account of the first user to a second digital account of the second user.

Example #19: The non-transitory computer-readable medium of any of Examples #16-18 may include program code that is executable by the one or more processors for causing the one or more processors to generate the non-fungible token.

Example #20: The non-transitory computer-readable medium of any of Examples #16-19 may include program code that is executable by the one or more processors for causing the one or more processors to store the encrypted well-log data in the new record in conjunction with the non-fungible token.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

What is claimed is:

1. A system comprising:
a well bore of a hydrocarbon well located in a geologic formation;
a well tool of a first entity including a sensor package, the well tool positioned in the wellbore to measure properties of the geologic formation proximate to the wellbore using the sensor package and to generate well logs based on the measured properties;
a distributed ledger computing system comprising a plurality of computer nodes that collectively implement a ledger network hosting a digital ledger, where a computer node of the plurality of computer nodes is communicatively coupled to the well tool, each computer node of the plurality of computer nodes includes one or more processors and one or more memories, and wherein the one or more computing nodes of the plurality of computing nodes are configured to perform operations comprising:

automatically receiving well-log data associated with a well log generated by the well tool while measuring the properties of the geologic formation proximate to the well bore;

compressing the well-log data to generate compressed well-log data using one of Huffman coding, arithmetic coding, Burrows-Wheeler transform, Lempel-Zic compression or run-length encoding compression techniques;

encrypting the compressed well-log data to generate encrypted compressed well-log data;

storing the encrypted compressed well-log data on the digital ledger;

generating metadata including a tag indicating well-log data characteristics selected from the group consisting of ownership, joint ownership interest, geographical location, measurement depth, creation date, and well tool type;

generating a new record that associates a non-fungible token with the encrypted compressed well-log data and the metadata, the non-fungible token being usable to track ownership of the well-log data; and publishing, based on an instruction from the first entity, the new record to the digital ledger in response to at least a subset of the plurality of computer nodes reaching a consensus decision to add the new record to the digital ledger;

executing, by the computer nodes, one or more smart contracts;

decrypting, by the one or more smart contracts, the encrypted compressed well-log data in the new record; and an automated control system associated with a second entity and communicatively coupled to the distributed ledger computing system, the automated control system including a processor and a memory having instructions that are executable by the processor for causing the automated control system to perform operations comprising:

receiving, from the first entity, authorization to access the well-log data;

analyzing the well-log data; and based on analyzing the well-log data, transmitting one or more commands to a hydrocarbon well site to control a well operation in a target well bore.

2. The system of claim 1, wherein authorization to access the new record by the second entity is based on executing the one or more smart contracts through which it is determinable that a predetermined condition has been satisfied.

3. The system of claim 1, wherein the target wellbore is the wellbore of the hydrocarbon well located in the geologic formation.

4. The system of claim 1, wherein a program code of at least one of the computer nodes of the ledger network is executable by the one or more processors of the at least one of the computer nodes for causing the one or more processors of the at least one of the computer nodes to:

generate an online digital marketplace for buying, licensing, and selling a plurality of well logs, wherein each well log of the plurality of well logs is defined by corresponding well log data and represented by a corresponding non-fungible token on the digital ledger; and wherein the online digital marketplace is searchable by a user to identify a subset of well logs, from among the plurality of well logs, having assigned tags that match a search criterion.

5. The system of claim 1, wherein the well tool is a logging-while-drilling tool.

6. The system of claim 1, wherein a program code of at least one of the computer nodes of the ledger network is executable by the one or more processors of the at least one of the computer nodes for causing the one or more processors of the at least one of the computer nodes to:

store the encrypted compressed well-log data and the metadata at a storage location that is separate from the digital ledger; and store a reference to the storage location in the new record.

7. The system of claim 1, wherein a program code of at least one of the computer nodes of the ledger network is executable by the one or more processors of the at least one of the computer nodes for causing the one or more processors of the at least one of the computer nodes to store the encrypted compressed well-log data and the metadata in the new record in conjunction with the non-fungible token.

8. A computer-implemented method comprising:

positioning a well tool of a first entity in a wellbore of a hydrocarbon well located in a geologic formation, the well tool including a sensor package;

communicatively coupling, to the well tool, a computer node of a distributed ledger computing system comprising a plurality of computer nodes that collectively implement a ledger network hosting a digital ledger;

operating, by the first entity, the sensor package of the well tool to measure properties of the geologic formation proximate to the wellbore and to generate well logs based on the measured properties;

automatically receiving, by the computer node from the well tool, well-log data associated with a well log generated by the well tool while measuring the properties of the formation proximate to the wellbore;

compressing, by the computer nodes, the well-log data to generate compressed well-log data using one of Huffman coding, arithmetic coding, Burrows-Wheeler transform, Lempel-Zic compression, or run-length encoding compression techniques;

encrypting, by the computer nodes, the compressed well-log data to generate encrypted compressed well-log data;

storing, by the computer nodes, the encrypted compressed well-log data on the digital ledger;

generating, by the computer nodes, metadata including a tag indicating well-log data characteristics selected from the group consisting of ownership, joint ownership interest, geographical location, measurement depth, creation date, and well tool type;

generating, by the computer nodes, a new record that associates a non-fungible token with the encrypted compressed well-log data and the metadata, the non-fungible token being usable to track ownership of the well-log data;

publishing, by the computer nodes, based on an instruction from the first entity, the new record to the digital ledger in response to at least a subset of the computer nodes reaching a consensus decision to add the new record to the digital ledger;

executing, by the computer nodes, one or more smart contracts;

decrypting, by the one or more smart contracts, the encrypted compressed well-log data in the new record;

communicatively coupling an automated control system associated with a second entity to the distributed ledger computing system;

receiving, by the automated control system associated with the second entity, from the first entity, authorization to access the well-log data;

analyzing, by the automated control system associated with the second entity, the well-log data; and based on analyzing the well-log data, transmitting, by the automated control system, one or more commands to a hydrocarbon well site to control a well operation in a target wellbore.

9. The method of claim 8, wherein authorization to access the new record by the second entity is based on executing the one or more smart contracts through which it is determined that a predetermined condition has been satisfied.

10. The method of claim 8, further comprising transferring ownership of the well log data from the first entity to the second entity by publishing another record to the digital ledger that transfers ownership of the non-fungible token from a first digital account of the first entity to a second digital account of the second entity.

11. The method of claim 8, further comprising generating an online digital marketplace for buying and selling a plurality of well logs, wherein each well log of the plurality of well logs is defined by corresponding well log data and represented by a corresponding non-fungible token on the digital ledger, and wherein the online digital marketplace is searchable by a user to identify a subset of well logs, from among the plurality of well logs, having assigned tags that match a search criterion.

12. The method of claim 8, wherein the target well bore is the well bore of the hydrocarbon well located in the geologic formation.

13. The method of claim 8, further comprising:

storing the encrypted compressed well-log data and the metadata at a storage location that is separate from the digital ledger; and storing a reference to the storage location in the new record.

14. The method of claim 8, further comprising storing the encrypted compressed well-log data and the metadata in the new record in conjunction with the nonfungible token.

15. The method of claim 8, further comprising generating the non-fungible token.

16. The system of claim 1, wherein the measured properties are selected from the group consisting of electrical properties, acoustic properties, radioactive properties, electromagnetic properties, pressure properties, and any combination thereof.

17. The system of claim 5, wherein the measured properties are selected from the group consisting of density, porosity, resistivity, magnetic resonance, compressional slowness, shear slowness, formation pressure, and any combination thereof.

18. The method of claim 8, wherein the measured properties are selected from the group consisting of electrical properties, acoustic properties, radioactive properties, electromagnetic properties, pressure properties, and any combination thereof.

19. The method of claim 8, wherein the well tool is a logging-while-drilling tool that measures the properties of the geologic formation during drilling of the well bore.

20. The method of claim 19, wherein the measured properties are selected from the group consisting of density, porosity, resistivity, magnetic resonance, compressional slowness, shear slowness, formation pressure, and any combination thereof.

* * * * *